United States Patent
Honjo et al.

[11] Patent Number: 5,532,041
[45] Date of Patent: * Jul. 2, 1996

[54] MAGNETIC RECORDING MEDIA AND METHOD FOR MAKING THEM

[75] Inventors: Yoshihiro Honjo, Saku; Yoshisuke Yamakawa, Niiza; Hiroshi Kawahara, Saku; Eizo Tsunoda, Komoro, all of Japan

[73] Assignee: TDK Corporation, Tokyo, Japan

[ * ] Notice: The portion of the term of this patent subsequent to Aug. 27, 2008, has been disclaimed.

[21] Appl. No.: 262,366

[22] Filed: Jun. 20, 1994

Related U.S. Application Data

[63] Continuation of Ser. No. 968,451, Oct. 29, 1992, abandoned, which is a continuation of Ser. No. 553,641, Jul. 18, 1990, abandoned.

[30] Foreign Application Priority Data

Jul. 18, 1989 [JP] Japan .................. 1-185345

[51] Int. Cl.$^6$ ................ G11B 5/66; B32B 3/10; B32B 5/16
[52] U.S. Cl. .......... 428/141; 428/332; 428/336; 428/694 B; 428/694 BA; 428/694 BR; 428/694 BM; 428/900; 427/128; 427/131
[58] Field of Search ................ 428/336, 332, 428/900, 694 B, 694 BA, 694 BR, 694 BM, 141; 427/128, 131

[56] References Cited

U.S. PATENT DOCUMENTS

| | | | |
|---|---|---|---|
| 4,624,883 | 11/1986 | Yamaguchi et al. | 428/694 |
| 4,624,894 | 11/1986 | Kishimoto | 428/900 |
| 4,741,953 | 5/1988 | Katsuta et al. | 428/900 |
| 4,959,263 | 9/1990 | Aonuma et al. | 428/694 |
| 4,992,330 | 2/1991 | Kawahara et al. | 428/900 |
| 5,043,210 | 8/1981 | Yomohowe | 428/323 |

FOREIGN PATENT DOCUMENTS

| | | |
|---|---|---|
| 0090052 | 10/1983 | European Pat. Off. . |
| 52-146517 | 12/1977 | Japan . |
| 56-148729 | 11/1981 | Japan . |
| 60-113321 | 6/1985 | Japan . |
| 61-257094 | 11/1986 | Japan . |
| 62-38522 | 2/1987 | Japan . |
| 63-259826 | 10/1988 | Japan . |
| 2067376 | 7/1981 | United Kingdom . |

*Primary Examiner*—Leszek Kiliman
*Attorney, Agent, or Firm*—Oblon, Spivak, McClelland, Maier & Neustadt

[57] ABSTRACT

A magnetic recording medium records two or more signals having different frequency bands by frequency multiplex recording. The non-magnetic substrate includes a first magnetic layer and a second magnetic layer on that order, said second magnetic layer having a thickness amounting to 70% or less of the shortest recording wavelength of the signals to be recorded.

23 Claims, 2 Drawing Sheets

MAGNETIC RECORDING MEDIA AND METHOD FOR MAKING THEM

This application is a Continuation of application Ser. No. 07/968,451, filed on Oct. 29, 1992, now abandoned is a continuation of Ser. No. 07/553,641 filed on Jul. 18, 1990, abandoned.

BACKGROUND OF THE INVENTION

1. Field of the Invention

The present invention relates to a magnetic recording medium, esp., a magnetic recording medium used for recording video signals in direct recording systems by the low-range conversion of the chrominance signal components such as S-VHS format, and a method for making such a recording medium.

2. Prior Art

A video signal comprises a chrominance signal component and a luminance signal component. Applied to the domestic VCR standards for VHS, etc. are direct recording systems by the low-range conversion of the chrominance signals in which they are converted into low frequency.

A coated type of video tape used for such home VCRs has been increasingly advanced in performance by the micronization of magnetic powders and improvements in the surface properties of a magnetic layer.

Thus, the micronization of magnetic powders and the improvements in the surface properties of magnetic layers increase high-range output and reduce noise, improving the luminance signal S/N. The improvements in the surface properties of a magnetic layer also serve to improve the chrominance signal S/N.

Such improvements of video tapes have resulted in the advent of the S-VHS standards in 1987.

According to the S-VHS standards now established, the recording frequency of the luminance signal preset is so high that its characteristics can be improved increasingly.

In the video tapes for S-VHS which are designed to record very-high-frequency luminance signals, the magnetic powders are further micronized to achieve much more increased coercivity than before.

However, it is known in the art that the finer the magnetic powders and the higher the coercivity, the more improved the high-range characteristics, i.e., the luminance signal S/N but the worse the low-range characteristics, i.e., the chrominance signal S/N. Moreover, the S-VHS format makes a much larger difference in the recording frequency between the luminance and chrominance signals, since it is substantially similar to the VHS format in the recording frequency of the chrominance signal.

With the video tapes for the S-VHS format, it is thus difficult to obtain satisfactory S/N for both the luminance and chrominance signals.

Another problem with the conventional video tapes is that their durability, esp., their still life becomes insufficient or is lowered, because the finer the magnetic powders, the lower the mechanical strength of the magnetic layers.

The present invention, accomplished with such situations in mind, has for its object to provide a magnetic recording medium excelling in both the luminance signal S/N and the chrominance S/N and improved in durability, and a method for making it.

SUMMARY OF THE INVENTION

The above and other objects of the present invention are attainable by the following aspects of the present invention.

(1) According to the first aspect, there is provided a magnetic recording medium for recording two or more signals having different frequency bands by frequency multiplex recording, characterized in that a non-magnetic substrate has on it a first magnetic layer and a second magnetic layer in that order, said second magnetic layer having a thickness amounting to 70% or less of the shortest recording wavelength of the signals to be recorded.

(2) According to the second aspect, there is provided a magnetic recording medium as recited in the 1st aspect, which is used to record a video signal comprising a luminance signal and a chrominance signal in a direct recording system by the low-range conversion of the chrominance signal component.

(3) According to the third aspect, there is provided a magnetic recording medium as recited in the 2nd aspect, wherein the luminance signal is substantially recorded on the second magnetic layer.

(4) According to the fourth aspect, there is provided a magnetic recording medium as recited in the 1st aspect, wherein the second magnetic layer has a thickness of 0.2 μm or more.

(5) According to the fifth aspect, there is provided a magnetic recording medium as set forth in the 1st aspect, wherein the second magnetic layer is higher in coercivity than the first magnetic layer.

(6) According to the sixth aspect, there is provided a magnetic recording medium as set forth in the 1st aspect, wherein the second magnetic layer has a centerline average surface roughness —Ra—of 0.01 μm or lower.

(7) According to the seventh aspect, there is provided a magnetic recording medium as set forth in the 6th aspect, wherein the non-magnetic substrate has a centerline average surface roughness —Ra—of 0.01 μm or lower.

(8) According to the eighth aspect, there is provided a method for making a magnetic recording medium as set forth in any one of the 1st–7th aspects, characterized in that:

the non-magnetic substrate is coated thereon with a magnetic coating material for the first magnetic layer, followed by smoothing and drying, and another coating material for the second magnetic layer is then provided on the first magnetic layer by coating.

The magnetic recording medium of the present invention includes on a non-magnetic substrate first and second magnetic layers on that order, said second magnetic layer having a thickness amounting to 70% or lower of the shortest recording wavelength of the signals to be recorded. This thickness is virtually equal to the effective recording depth of the luminance signal.

Then, the magnetic characteristics of the second and first magnetic layers are suitable for recording the luminance and chrominance signals, respectively.

When the video signal is recorded on such a magnetic recording medium in the direct recording system by the low-range conversion of the chrominance signal component, the luminance signal S/N is improved, because it is substantially recorded on the second magnetic layer alone.

Furthermore, since the thickness of the second magnetic layer is virtually equal to only the effective recording depth of the luminance signal, it is possible to minimize the proportion of the chrominance signal to be recorded on the second magnetic layer, while attaining the best luminance signal S/N.

Thus, the proportion of the chrominance signal to be recorded on the first magnetic layer can be increased to a maximum so that the chrominance signal S/N ratio can be improved very satisfactorily.

The magnetic layer arrangement of a double-layer structure according to the present invention has improved mechanical strength and durability than a single magnetic layer of similar thickness. This mechanical strength can be further improved by coating the coating material for the second magnetic layer on the first magnetic layer after the latter has been dried and, preferably, cured.

BRIEF DESCRIPTION OF THE DRAWINGS

The present invention will now be explained in greater detail, specifically but not exclusively, with reference to the accompanying drawings, in which.

ILLUSTRATIVE DESCRIPTION OF THE PREFERRED EMBODIMENTS

Figure 1:
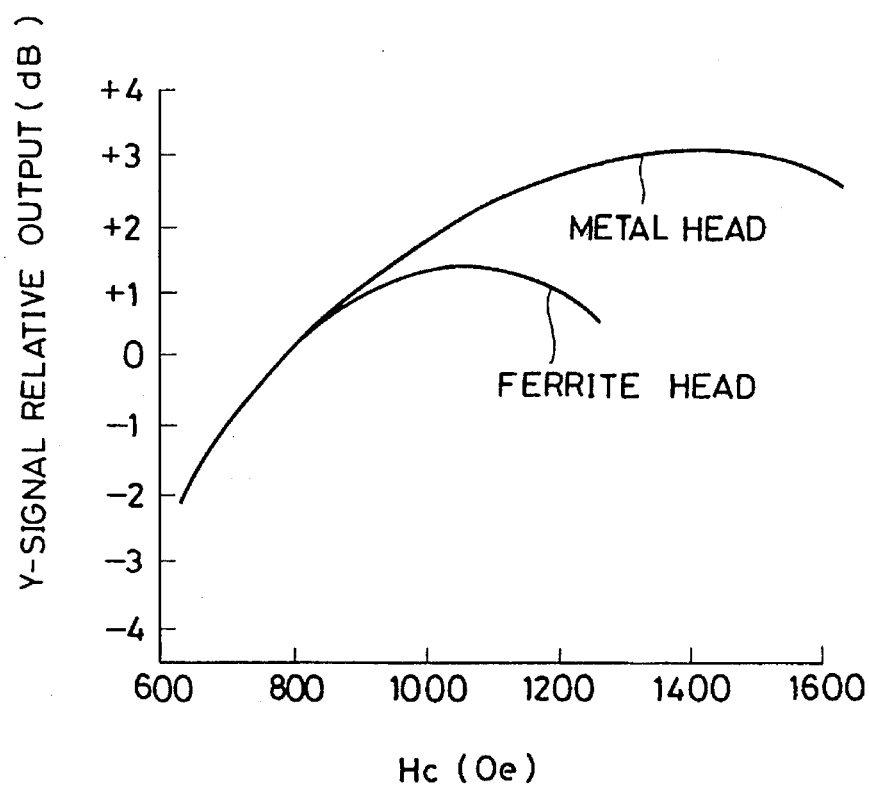
FIG. 1 is a graph illustrating the relation between the coercivity of a magnetic layer and the playback output of a luminance signal.

In what follows, the present invention will be explained more illustratively.

The magnetic recording medium of the present invention is used with systems of recording two or more signals having different frequency bands by frequency multiplex recording.

Of such recording systems to which the present invention is applicable, the most preference is given to a direct recording system by the low-range conversion of the chrominance signal component of the video signal. In this system, the video signal comprises a luminance signal component and a chrominance signal component, with the chrominance signal zone lying in a region of frequency lower than does the luminance signal zone.

In the description that follows, the present invention will be explained with reference to this system.

The magnetic recording medium of the present invention includes on the non-magnetic substrate the first and second magnetic layers on that order, said second recording layer having a thickness amounting to 70% or less of the shortest recording wavelength of the signals to be recorded.

When the signal to be recorded is a video signal, the "shortest recording wavelength" refers to a white peak wavelength of the luminance signal component. In such saturation recording as occurs with the luminance signal, the above thickness is nearly in coincidence with the effective recording depth.

When the thickness of the second magnetic layer exceeds the upper limit of the above-defined range, the proportion of the chrominance signal to be recorded on the first magnetic layer is so reduced that its output and S/N drop.

If the thickness of the second magnetic layer is 50% or less of the shortest recording wavelength, then the chrominance signal output and S/N are improved strikingly.

In the present invention, the second magnetic layer should preferably be 0.2 μm or upwards in thickness.

When the thickness of the second magnetic layer is less than that lower limit, it is substantially impossible to record the luminance signal in the second magnetic layer alone, resulting in drops of its output and S/N. In the case of a coated type of magnetic layer, abrasive particles, etc. contained in it would be exposed to view at a thickness less than the above lower limit.

It is noted that the thickness of the first magnetic layer is not critical, and may be determined such that the total thickness of the first and second magnetic layers assumes an appropriate value depending upon various systems to which the magnetic recording medium is applied.

Set out in Table 1 are the thickness range of the second magnetic layer and the preferable range of the total thickness of the first and second magnetic layers in various video recording systems.

TABLE 1

| | Recording Systems | Thickness of 2nd Magnetic Layer | Total Thickness of 1st 2nd Magnetic Layers |
|---|---|---|---|
| VHS | VHS | 0.20–0.92 μm | 2.0–4.0 μm |
| | S-VHS | 0.20–0.58 μm | 2.0–4.0 μm |
| 8 | millimeters | 0.20–0.48 μm | 1.0–4.0 μm |
| | Hi8 | 0.20–0.34 μm | 1.0–4.0 μm |
| β | HB β* | 0.20–0.88 μm | 2.0–4.0 μm |
| | SHB β** | 0.20–0.81 μm | 2.0–4.0 μm |
| | ED-β | 0.20–0.53 μm | 2.0–4.0 μm |

*HB β: High-Band B
**SHB β: Super High-Band 3

It is noted that the thickness of each magnetic layer may be found from a transmission type electron microphotograph—TEM photograph—of the section of the magnetic recording medium.

In the present invention, it is preferable that the second magnetic layer is higher in coercivity than the first magnetic layer.

Since the luminance signal is substantially recorded on the second magnetic layer alone, successful recording of the luminance signal of a short wavelength can be achieved by allowing the second magnetic layer to have higher coercivity. It is then possible to make successful recording of the chrominance signal, which is of a wavelength so long that it cannot be subject to saturation recording, on the first magnetic layer having lower coercivity.

Set out in Table 2 are the preferable and optimum ranges of coercivity of the first and second magnetic layers.

It is also understood that other magnetic properties of the first and second magnetic layers may lie in such ranges as lending themselves well to recording the chrominance and luminance signals. Although not critical, the remanence and squareness ratio, for instance, may preferably lie within such ranges as set out in Table 2.

No particular limitation is placed on the center-line average surface roughness—Ra—of the second magnetic layer. In order to make successful recording of signals of a short wavelength, however, it should preferably be 0.01 μm or below. The lower limit should then preferably be about 0.002 μm, because no sufficient traveling performance can be achieved when the layer is made smooth excessively on its surface.

It is noted that Ra is provided for in JIS B 0601.

In order to achieve the second magnetic layer having such an Ra, it is preferred that the Ra of the non-magnetic substrate is 0.01 μm or below. The lower limit is then about 0.002 μm due to the need of ensuring improved traveling performance in the steps of producing substrates and media.

Furthermore, the Ra of the first magnetic layer should preferably 0.01 μm or below. By providing the second magnetic layer on the first magnetic layer having an Ra lying within such a range, it is easy to obtain the second magnetic layer having such an Ra as defined above. The lower limit should then preferably be 0.002 μm, because of the surface properties of the first magnetic layer being almost faithfully reflected in those of the second magnetic layer and for the same reason as set forth in connection with the lower limit of the Ra of the second magnetic layer.

Set out in Table 2 are the particularly preferred Ra values of the non-magnetic substrate and the 1st and 2nd magnetic layers.

The coated type of magnetic layer may have a particle size suitable for the frequency to be recorded on each of its layer parts, i.e., the first and second magnetic layer parts. Preferable to this end is that magnetic powders of a smaller BET value are used for the first magnetic layer, whereas magnetic powders of a larger BET value are employed for the second magnetic layer.

No specific limitation is imposed upon the BET values of the magnetic powders used for each magnetic layer. In the VHS and β systems save the ED-β format, for instance, it is preferred that Co-containing iron oxide particles having a BET value of about 30 to 45 $m^2/g$ and Co-containing iron oxide particles or magnetic metal powders having a BET value of about 40 to 55 $m^2/g$ are used for the first and second magnetic layers, respectively.

TABLE 2

| Formats | Coercivity of 1st Magnetic Layer | | Coercivity of 2nd Magnetic Layer | |
|---|---|---|---|---|
| | Preferable | Optimum | Preferable | Optimum |
| VHS, HB β*, SHB β** | 500–750 | 600–700 | 650–900 | 750–850 |
| S-VHS | 600–800 | 650–750 | 850–1000 | 870–970 |
| 8 mm, Hi8, ED-β | 600–1300 | 650–1200 | 1400–1800 | 1500–1700 |

| Formats | Remanence | | Squareness Ratio | | Ra (μm) | | |
|---|---|---|---|---|---|---|---|
| | 1st Magnetic Layer | 2nd Magnetic Layer | 1st Magnetic Layer | 2nd Magnetic Layer | 1st Magnetic Layer | 2nd Magnetic Layer | Substrate |
| VHS, HB β*, SHB β** | 1500≦ | 1300≦ | 0.83≦ | 0.80≦ | 0.0030–0.0060 | 0.0030–0.0060 | 0.0030–0.010 |
| S-VHS | 1500≦ | 1300≦ | 0.83≦ | 0.80≦ | 0.0020–0.0050 | 0.0020–0.0050 | 0.0030–0.0090 |
| 8 mm, Hi8, ED-β | 1500≦ | 1900≦ | 0.83≦ | 0.80≦ | 0.0020–0.0050 | 0.0020–0.0050 | 0.0020–0.0070 |

*HB β High-Band β
**SHB β Super High-Band β

It is understood that the preferable ranges set out in Tables 1 and 2 follow the NTSC standards. However, the preferable thickness of the second magnetic layer may similarly be found according to other standards inclusive of the PAL standards. Preferable ranges of other conditions may be found experimentally or in the manner provided for in the NTSC standards.

As long as the first and second magnetic layers have such properties as stated above, no particular limitation is imposed thereon. For them, various coated types of magnetic layers heretofore known in the art may be used.

For instance, use may be made of magnetic layers formed of magnetic particles and binders to which various additives such as electrically conductive fillers, abrasives, solid lubricants, liquid lubricants and surfactants may be added, if required.

As the magnetic particles, use may be made of any material which can be used for ordinary magnetic recording media. For instance, suitable particles such as iron oxide particles, e.g., $\gamma$—$Fe_2O_3$; Co-containing iron oxide particles, e.g., Co-containing $\gamma$—$Fe_2O_3$; magnetic metal particles; barium ferrite particles; and $CrO_2$ particles may be selected depending upon the purpose. Their coercivity and specific surface area (as measured by the BET method), for instance, may also be determined depending upon the purpose.

In the 8-mm system and ED-β format, it is desired that magnetic metal powders or Co-containing iron oxide particles having a BET value of about 30 to 45 $m^2/g$ and magnetic metal powders having a BET value of about 50 to 65 $m^2/g$ be used for the first and second magnetic layers, respectively.

As the binder, use may be made of any material which can be used for ordinary magnetic recording media. For instance, suitable binders such as reactive types of binders such as heat-curing and reactive resins; and radiation curing types of binders such as radiation curing resins may be selected depending upon the purpose.

Details of such coated types of magnetic layers are set forth in our co-pending applications, typically, Japanese Patent Kokai Application No. 62(1987)-38522.

No particular limitation is imposed upon the non-magnetic substrate used for the magnetic recording medium of the present invention. A material chosen from various flexible materials and various rigid materials depending upon the purpose may be formed into a predetermined tape or other shape of predetermined size. For instance, polyesters such as polyethylene terephthalate may be used as the flexible materials.

It is understood that when the magnetic recording medium of the present invention is applied in the form of video tape, a back coat may optionally be provided on the other side of the non-magnetic substrate, i.e., the side in opposition to the side having the magnetic layers. The back coat is not critical, and may be any known coated type of back coat containing electrically conductive fillers and various pigments, or alternatively formed of a plasma-polymerized film.

Preferably, such a magnetic recording medium is produced by coating a coating material for the first magnetic layer on the non-magnetic substrate, followed by at least drying and smoothing, and providing another coating material for the second magnetic layer on the first magnetic layer. Most preferably, the coating material for the second magnetic layer is provided on the first magnetic layer by coating after the coating material for the first magnetic layer has been cured.

With such an arrangement, it is easy to control the thickness of each magnetic layer, since it is most unlikely that when coating the magnetic coating material for the second magnetic layer, it may be mixed with the previously coated coating material for the first magnetic layer.

This makes it possible to ensure the properties of each magnetic layer and is particularly effective for improving the output of the luminance signal recorded on the second magnetic layer.

The provision of the magnetic layers by such a method makes it possible to improve their mechanical strength as a whole.

The preferred degree of drying of the coating material for the first magnetic layer at the time of providing the coating material for the second magnetic layer by coating, for instance, may be expressed in terms of the percentage of residual solvents. This percentage is preferably 1% by weight or below.

The preferable degree of curing of the coating material for the first magnetic layer, for instance, may also be expressed in terms of gel fraction. Preferably, this fraction is upward of 70%. It is understood that the gel fraction refers to the weight ratio of the binder before and after the coated film is immersed in an organic solvent such as methyl ethyl ketone, by way of example. The immersion conditions, for example, are about 2 hours at 80° C.

After smoothing, the coating material for the first magnetic layer has preferably an Ra lying within such a range as defined above. This Ra is preserved even after curing.

No particular limitation is imposed upon how to coat the coating materials and how to make the resulting coats smooth. Suitable means so far known in the art may be selected. For curing, suitable means may again be selected depending upon the binders used.

As the video signals are recorded on the magnetic recording medium of the present invention in the direct recording system by the low-range conversion of the chrominance signals, the luminance and chrominance signals are both recorded on the second magnetic layer. However, it is only the chrominance signals which are substantially recorded on the first magnetic layer.

Although varying with the systems applied, sound carrier signals may be recorded on both the first and second magnetic layers.

In the S-VHS and VHS formats, for instance, not only linear sound carrier signal but also hi-fi sound carrier signal are recorded in the so-called baseband recording manner in which the audio signal is recorded down to the depths of the magnetic layer of video tape, wherein the video signal is recorded on the surface of the magnetic layer of video tape. In this case, the video signal is superimposed at different azimuth angles on the hi-fi sound carrier signal already recorded. At the time of recording the video signal, a part of the hi-fi sound carrier signal is erased.

When the coercivity of the second magnetic layer is made higher than that of the first magnetic layer in the present invention, it is substantially unlikely that the hi-fi sound carrier signal recorded on the second magnetic layer may be erased by the superimposed recording of the video signal. This results in an improvement in the hi-fi sound carrier signal output. It is noted, however, that no simultaneous reproduction of the hi-fi sound carrier and video signals occurs, because they are recorded at different azimuth angles.

Furthermore, since the magnetic layer of lower coercivity is suitable for recording a sound carrier signal of low frequency, the hi-fi sound recording signal output is further improved with an improvement in the linear sound carrier signal output.

The magnetic recording medium of the present invention is very effective for recording video signals in the direct recording system by the low-range conversion of the chrominance signals and are suitable for home video tapes for the S-VHS, VHS, β, high-band β, super high-band β, ED-β, 8-mm and Hi8 formats. Of these formats, the present invention is most advantageously applicable to the coated type of video tape for the S-VHS format in which there is a large difference in the recording wavelength between the luminance and chrominance signals.

Furthermore, the present invention is effective for not only recording the luminance and chrominance signals separately but also recording two or more signals having different recording frequency bands.

Such recording systems include the above-mentioned combination of video signals with hi-fi sound carrier signals, a combination of video signals with PCM sound carrier signals or tracking servo signals, and the like. In these cases, the present invention is applicable to not only video tapes but also video floppy disks for still video cameras.

In addition, when recording a signal having three or more frequency bands, a magnetic layer arrangement of a multilayered structure may be provided corresponding to the effective recording depth of each signal component.

EXAMPLES

The present invention will now be explained in greater detail, specifically but not exclusively, with reference to the following illustrative examples.

Experimental Example 1

Examination was made of the relations between the coercivity of the magnetic layers and the playback outputs of the luminance and chrominance signals.

For measurement, tape samples were prepared in the following manners.

The following compositions containing magnetic powders having different coercivities were put in a ball mill, in which they were dispersed for 24 hours to prepare various magnetic coating materials.

Composition I, mentioned below, was used to form a magnetic layer having a coercivity of 1200 Oe or below, while Composition II, again mentioned below, was used to form a magnetic layer having a coercivity exceeding 1200 Oe.

In the description that follows, the "parts" all mean parts by weight.

Composition I

| | |
|---|---|
| Co-containing $\gamma$-Fe$_2$O$_3$ (having a BET value of 45 m$^2$/g) | 100 parts |
| Vinyl chloride/vinyl acetate/vinyl alcohol (92:2:6) copolymer (having a degree of polymerization of 400) | 10 parts |
| Polyurethane type resin (having a number-average molecular weight of 40,000) | 6 parts |
| Polyisocyanate | 3 parts |
| $\alpha$-Al$_2$O$_3$ (having a mean particle size of about 0.2 $\mu$m) | 8 parts |
| Lubricant | 2 parts |
| Methyl ethyl ketone | 200 parts |
| Cyclohexanone | 100 parts |

Composition II

| | |
|---|---|
| Magnetic alloy powders (having a BET value of 50 m$^2$/g) | 100 parts |
| Vinyl chloride/vinyl acetate/vinyl alcohol (92:2:6) copolymer (having a degree of polymerization of 400) | 10 parts |
| Polyurethane type resin (having a number-average molecular weight of 40,000) | 6 parts |
| Polyisocyanate | 3 parts |
| $\alpha$-Al$_2$O$_3$ (having a mean particle size of about 0.2 $\mu$m) | 8 parts |
| Lubricant | 2 parts |
| Methyl ethyl ketone | 250 parts |
| Cyclohexanone | 100 parts |

With gravure techniques, the obtained magnetic coating materials were coated on a 14-$\mu$m thick polyester base film, followed by drying and surface smoothing. Afterwards, they were subjected to 24-hour curing reactions at 60° C.

Then, the film was cut to a width of 12.65 mm to obtain magnetic tape samples.

The luminance and chrominance signal outputs were measured in the following manners.

It is noted that an NV-FS 1, made by Matsushita, modified such that it could work in a still state, was used for a measuring VTR, and HP3325A and HP3585A (both made by Yokogawa-Hewlett-Packard, Ltd.) for a signal oscillator and a spectrum analyzer, respectively.

Measurement of Luminance Signal

A 7-MHz sine wave was recorded on each sample with a recording current providing a maximum output, and the playback output was read out on the spectrum analyzer.

Measurement of Chrominance Signal

While a 629-kHz signal was superimposed on the 7-MHz recording current used for measuring the luminance signal, it was recorded with varied recording currents. The optimum recording current was then found by a recording current provding a spurious noise (Y-2C noise) of −22 dB during playback.

The 629-kHz signal was superimposed and recorded on the 7-MHz signal with the thus found optimum recording current. By definition, the chrominance signal output was then determined by the 629-kHz component of the playback output components.

Figure 2:
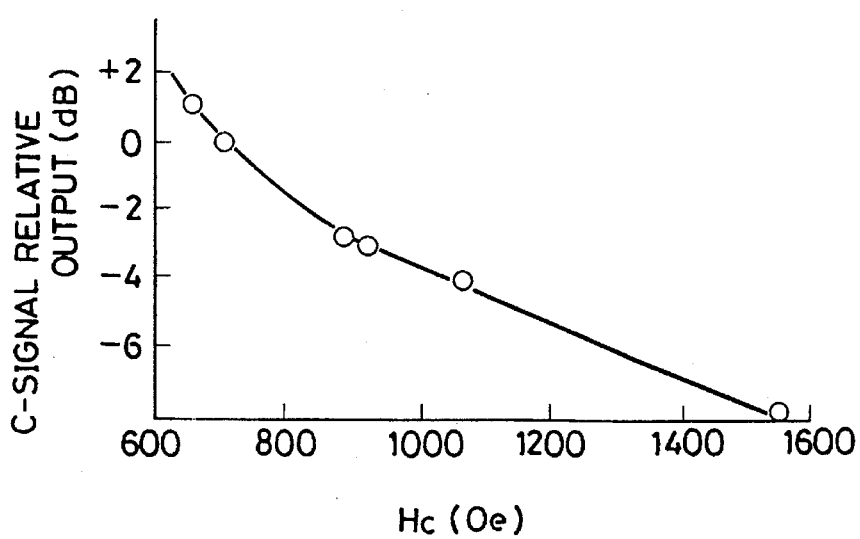
FIG. 2 is a graph illustrating the relation between the coercivity of a magnetic layer and the playback output of a chrominance signal.

The relations between the coercivity (Hc) of each magnetic layer and the luminance (Y) and chrominance (C) signal playback outputs are graphically illustrated in FIGS. 1 and 2, respectively. The results of measurement on magnetic metal and ferrite heads are also shown in FIG. 1. The results of measurement on the magnetic metal head are illustrated in FIG. 2.

Experimental Example 2

The effective recording depth of the luminance signal in the S-VHS format was measured.

| | |
|---|---|
| Co-containing $\gamma$-Fe$_2$O$_3$ (having a BET value of 50 m$^2$/g and a coercivity of 830 Oe) | 100 parts |
| Vinyl chloride/vinyl acetate/vinyl alcohol (92:2:6) copolymer (having a degree of polymerization of 400) | 10 parts |
| Polyurethane type resin (having a number-average molecular weight of 40,000) | 6 parts |
| Polyisocyanate | 3 parts |
| a-Al$_2$O$_3$ (having a mean particle size of about 0.2 $\mu$m) | 8 parts |
| Lubricant | 2 parts |
| Methyl ethyl ketone | 200 parts |
| Cyclohexanone | 100 parts |

A coating material, obtained from this composition in similar manners as stated above, was coated a polyester base film at varied thickness by means of a reverse roll. After drying and surface smoothing, the resultant coat was cured and the film was cut in similar manners as stated above, thereby obtaining tape samples including magnetic layers varying in thickness.

The thickness of the base film was selected from a range of 14 to 17 $\mu$m such that the total tape thickness of each sample was substantially kept constant.

These samples were tested for their luminance and chrominance signal playback outputs in similar manners as mentioned above.

Figure 3:
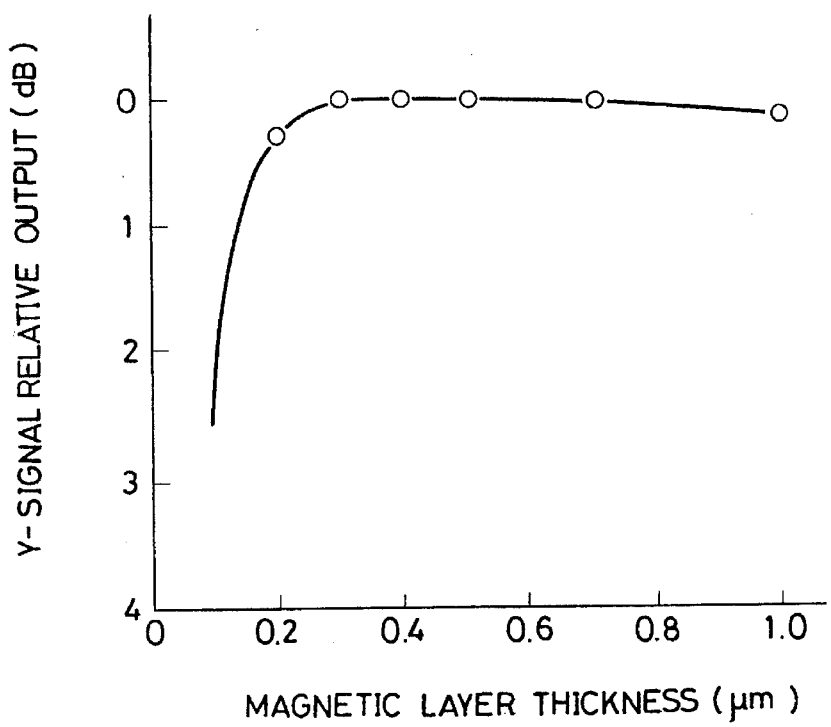
FIG. 3 is a graph illustrating the relation between the thickness of a magnetic layer and the playback output of a luminance signal.
Figure 4:
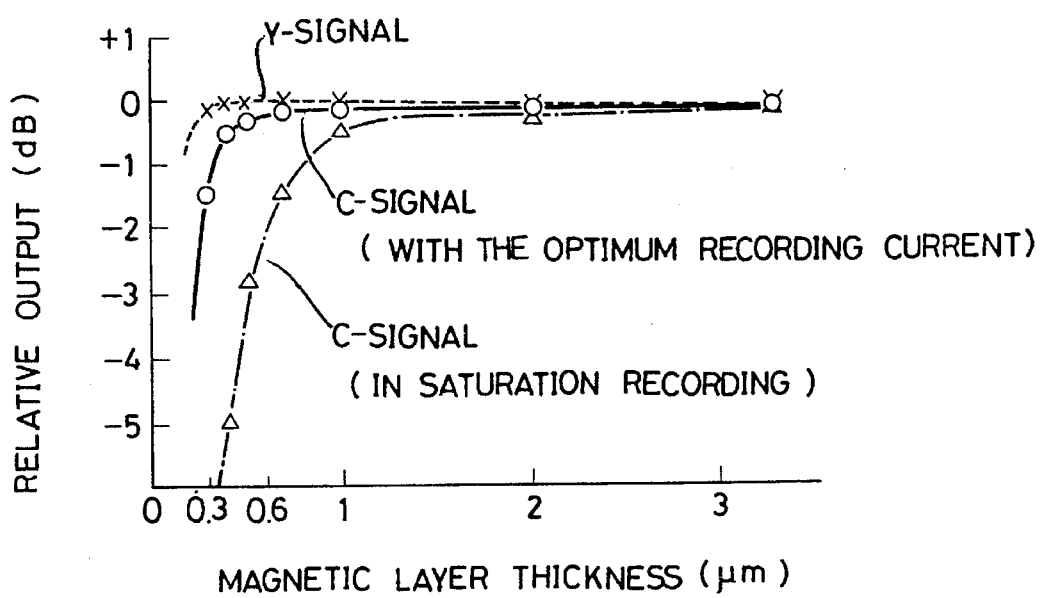
FIG. 4 is a graph illustrating the relation between the thickness of a magnetic layer and the playback outputs of chrominance and luminance signals.

The relations between the thickness of each magnetic layer and the luminance and chrominance signal playback outputs are graphically illustrated in FIGS. 3 and 4, respectively.

FIG. 4 also illustrates the playback output of the chrominance signal recorded with the optimum recording current as found above and the chrominance signal playback output when saturation recording was carried out, together with the luminance signal playback output shown in FIG. 3.

From FIG. 3, it is appreciated that if the thickness of the magnetic layer is upward of 0.2 $\mu$m, then any drop of the luminance signal output would pose no problem at all.

Example 1

Prepared was an S-VHS tape sample including the first and second magnetic layers.

With the following composition, a magnetic coating material was prepared in similar manners as stated above.

| | |
|---|---|
| Co-containing $\gamma$-Fe$_2$O$_3$ (having a BET value of 40 m$^2$/g and a coercivity of 650 Oe) | 100 parts |
| Vinyl chloride/vinyl acetate/vinyl alcohol (92:2:6) copolymer (having a degree of polymerization of 400) | 10 parts |
| Polyurethane type resin (having a number-average molecular weight of 40,000) | 6 parts |
| Polyisocyanate | 3 parts |
| $\alpha$-Fe$_2$O$_3$ (having a mean particle size of about 0.15 $\mu$m) | 4 parts |
| Lubricant | 2 parts |
| Methyl ethyl ketone | 200 parts |
| Cyclohexanone | 100 parts |

The same as Composition III.

A coating material prepared from Composition IV was coated on a polyester base film by means of a reverse roll, followed by drying and smoothing. Afterwards, the film was placed in a constant temperature chamber of 60° C. for 24-hour curing, thereby obtaining the first magnetic layer.

The magnetic coating material was found to have a percentage of residual solvents of 0.5% by weight and a degree of curing of 85% expressed in terms of gel fraction.

As already stated, the gel fraction was found by measuring the weight ratio of the binder before and after immersing the magnetic layer in methyl ethyl ketone at 80° C. for 2 hours.

Then, a magnetic coating material prepared from Composition V was coated on the first magnetic layer by means of a reverse roll, followed by drying and surface smoothing.

Furthermore, the base film was coated on its back side with a coating material comprising the following Composition VI at a thickness of about 1.0 μm, followed by drying.

| | |
|---|---|
| Carbon black (having a mean particle size of 0.02 μm) | 30 parts |
| $\alpha$-$Fe_2O_3$ (having a mean particle size of about 0.15 μm) | 1 parts |
| Nitrocellulose | 20 parts |
| Polyurethane type resin (having a number-average molecular weight of 40,000) | 10 parts |
| Polyisocyanate | 5 parts |
| Lubricant | 1 parts |
| Methyl ethyl ketone | 200 parts |
| Cyclohexanone | 100 parts |
| Toluene | 100 parts |

Then, curing was carried out in similar manners as stated above, thereby obtaining the second magnetic layer and a back coat.

Subsequently, the base film was cut to a width of 12.65 mm to obtain a tape sample.

Various samples were prepared with the 1st and 2nd magnetic layers varying in thickness.

Prepared for the purpose of comparison were Sample No. 1 having the first magnetic layer alone and Sample No. 8 having the second magnetic layer alone.

Set out below are the magnetic properties and Ra of the 1st and 2nd magnetic layers in these samples.

TABLE 3

| | 1st Magnetic Layer | 2nd Magnetic Layer |
|---|---|---|
| Coercivity (Oe) | 700 | 930 |
| Remanence (G) | 1800 | 1650 |
| Squareness ratio | 0.88 | 0.89 |

TABLE 3-continued

| | 1st Magnetic Layer | 2nd Magnetic Layer |
|---|---|---|
| Ra (μm) | 0.0045 | 0.0048 |

It is understood that the base film had an Ra regulated to 0.0070 μm.

These samples were measured for the playback outputs and S/N of the luminance and chrominance signals. The VTR used for measurement was a BR-S711 made by JVC, and the signal oscillator and spectrum analyzer used a TG-7 made by Hewlett Packard Shibasoku and an HP3585A made by respectively.

The playback output was determined by measuring the output of each carrier frequency component with the use of the spectrum analyzer, and the S/N was measured with the use of a 925D made by Shibasoku.

The results are set out in Table 4.

Each of the samples referred to in Table 4 was also tested for still life.

The still life referred to in Table 4 was estimated with an HR-D380 made by JVC modified such that it could be kept still unrestrictedly. Recording and reproducing color bars were continued until the still picture was severely disordered. By the length of this time, the still life was evaluated.

TABLE 4

| | Thickness (μm) | | Chrominance Signal | | Luminance Signal | | Still |
|---|---|---|---|---|---|---|---|
| Sample No. | 2nd Magnetic Layer | 1st Magnetic Layer | Output (dB) | S/N (dB) | Output (dB) | S/N (dB) | Life (min.) |
| 1* | 0 | 3.3 | +6.5 | +1.5 | −2.5 | −3.2 | 15 |
| 2 | 0.2 | 3.1 | +5.5 | +3.0 | +1.9 | +1.5 | 60 or more |
| 3 | 0.3 | 3.0 | +4.6 | +2.9 | +2.1 | +1.6 | 60 or more |
| 4 | 0.4 | 2.9 | +3.0 | +2.5 | +2.1 | +1.6 | 60 or more |
| 5 | 0.5 | 2.8 | +1.8 | +2.0 | +2.0 | +1.7 | 60 or more |
| 6* | 0.7 | 2.6 | +0.5 | +0.3 | +2.2 | +1.6 | 45 |
| 7* | 1.0 | 2.3 | +0.4 | +0.4 | +2.0 | +1.6 | 39 |
| 8* | 3.3 | 0 | +0.5 | +0.4 | +2.1 | +1.7 | 30 |

*Comparison

The results tabulated in Table 4 explains explicitly the effect of the present invention.

Sample Nos. 2–5, in which the second magnetic layer had a thickness lying within the range of the present invention, all give high luminance and chrominance signal outputs with improvements in their S/N.

By contrast, Sample Nos. 6–8, in which the second magnetic layer had a thickness larger than the effective recording depth of the luminance signal, are much reduced in the chrominance signal outputs and S/N. Furthermore, Sample No. 1 having the first magnetic layer alone is so unbalanced in its frequency characteristics that its S/N drops.

In the still life testing, the samples according to the present invention all achieve good results.

Next, a sample was prepared by providing the coating material for the second magnetic layer on the coating material for the first magnetic layer previously coated, not via any drying step. The 1st and 2nd magnetic layers of this sample had the same thickness as those of Sample No. 3 shown in Table 4.

This sample was found to have its luminance signal output reduced to +1.3 dB and its still life lowered to 49 minutes.

Example 2

In accordance with the present invention, a video tape sample for the 8-mm format was prepared, which included a magnetic layer arrangement of a coated type of double-layer structure.

The first magnetic layer part had a coercivity of 700 Oe and a remanence of 1800 G, while the second magnetic layer part had a coercivity of 1550 Oe and a remanence of 2700 G. In similar manners as described above, the samples were tested at varied thickness of the 1st and 2nd magnetic layers for the playback output and S/N of each signal as well as their still life. Prepared for the purpose of comparison were also samples each having the first or second magnetic layer alone, which were in turn tested for similar characteristics.

The results obtained with these samples were similar to those attained with the S-VHS tape samples shown in Table 4.

Similar measurements and tests were performed in various systems such as VHS, Hi8 and β. The present samples gave similar results as mentioned above.

As described above, the present invention achieves magnetic recording media which can successfully record both the luminance and chrominance signals and are of improved durability.

It will be appreciated by those of ordinary skill in the art that the present invention can be embodied in other forms without departing from the spirit or essential characteristics thereof.

We claim:

1. A magnetic recording medium in a direct recording system for recording at least two signals having different frequency bands by frequency multiplex recording, said medium comprising:

a non-magnetic substrate;

a first magnetic layer on the substrate and a second magnetic layer on the first magnetic layer; and wherein said second magnetic layer has a thickness within the range between 0.2 and 0.58 μm, both said first and second magnetic layers have a total thickness between 2.0 and 4.0 μm, and said first magnetic layer has a coercivity of between 600 and 800 Oe, and said second magnetic layer has a coercivity of between 850 and 1000 Oe.

2. A magnetic recording medium in a direct recording system for recording at least two signals having different frequency bands by frequency multiplex recording, said medium comprising:

a non-magnetic substrate;

a first magnetic layer on the substrate and a second magnetic layer on the first magnetic layer; and wherein said second magnetic layer has a thickness within the range between 0.2 and 0.48 μm, both said first and second magnetic layers have a total thickness between 1.0 and 4.0 μm, said first magnetic layer has a coercivity of between 600 and 1300 Oe, and said second magnetic layer has a coercivity of between 1400 and 1800 Oe.

3. A magnetic recording medium in a direct recording system for recording at least two signals having different frequency bands by frequency multiplex recording, said medium comprising:

a non-magnetic substrate;

a first magnetic layer on the substrate and a second magnetic layer on the first magnetic layer; and wherein said second magnetic layer has a thickness within the range between 0.2 and 0.34 μm, both said first and second magnetic layers have a total thickness between 1.0 and 4.0 μm, said first magnetic layer has a coercivity of between 600 and 1300 Oe, and said second magnetic layer has a coercivity of between 1400 and 1800 Oe.

4. A magnetic recording medium in a direct recording system for recording at least two signals having different frequency bands by frequency multiplex recording, said medium comprising:

a non-magnetic substrate;

a first magnetic layer on the substrate and a second magnetic layer on the first magnetic layer; and wherein said second magnetic layer has a thickness within the range between 0.2 and 0.88 μm, both said first and second magnetic layers have a total thickness between 2.0 and 4.0 μm, said first magnetic layer has a coercivity of between 500 and 750 Oe, and said second magnetic layer has a coercivity of between 650 and 900 Oe.

5. A magnetic recording medium in a direct recording system for recording at least two signals having different frequency bands by frequency multiplex recording, said medium comprising:

a non-magnetic substrate;

a first magnetic layer on the substrate and a second magnetic layer on the first magnetic layer; and wherein said second magnetic layer has a thickness within the range between 0.2 and 0.81 μm, both said first and second magnetic layers have a total thickness between 2.0 and 4.0 μm, said first magnetic layer has a coercivity of between 500 and 750 Oe, and said second magnetic layer has a coercivity of between 650 and 900 Oe.

6. A magnetic recording medium in a direct recording system for recording at least two signals having different frequency bands by frequency multiplex recording, said medium comprising:

a non-magnetic substrate;

a first magnetic layer on the substrate and a second magnetic layer on the first magnetic layer; and wherein said second magnetic layer has a thickness within the range between 0.2 and 0.53 μm, both said first and second magnetic layers have a total thickness between 2.0 and 4.0 μm, said first magnetic layer has a coercivity of between 600 and 1300 Oe, and said second magnetic layer has a coercivity of between 1400 and 1800 Oe.

7. A magnetic recording medium in a direct recording system for recording at least two signals having different frequency bands by frequency multiplex recording, said medium comprising:
- a non-magnetic substrate;
- a first magnetic layer on the substrate and a second magnetic layer on the first magnetic layer; and
- wherein said second magnetic layer has a thickness within the range between 0.2 and 0.58 μm,
- said first magnetic layer has a coercivity of between 600 and 800 Oe, and
- said second magnetic layer has a coercivity of between 850 and 1000 Oe.

8. A magnetic recording medium in a direct recording system for recording at least two signals having different frequency bands by frequency multiplex recording, said medium comprising:
- a non-magnetic substrate;
- a first magnetic layer on the substrate and a second magnetic layer on the first magnetic layer; and
- wherein said second magnetic layer has a thickness within the range of 0.2 to 0.7 μm,
- said first magnetic layer has a coercivity of between 600 and 800 Oe, and
- said second magnetic layer has a coercivity of between 850 and 1000 Oe.

9. A magnetic recording medium in a direct recording system for recording at least two signals having different frequency bands by frequency multiplex recording, said medium comprising:
- a non-magnetic substrate;
- a first magnetic layer on the substrate and a second magnetic layer on the first magnetic layer; and
- wherein the second magnetic layer has a thickness within the range of 0.2 to 0.5 μm,
- said first magnetic layer has a coercivity of between 600 and 800 Oe, and
- said second magnetic layer has a coercivity of between 850 and 1000 Oe.

10. A magnetic recording medium in a direct recording system for recording at least two signals having different frequency bands for recording by frequency multiplex recording, said medium comprising:
- a non-magnetic substrate;
- a first magnetic layer on the substrate and a second magnetic layer on the first magnetic layer; and
- wherein said second magnetic layer has a thickness within the range of 0.2 to 0.7 μm,
- said first magnetic layer has a coercivity of between 500 and 800 Oe, and
- said second magnetic layer has a coercivity of between 600 and 1000 Oe.

11. A magnetic recording medium according to any one of claims 1–6, wherein:
- said second layer has magnetic orientation corresponding to the luminance signal, thereby providing a recording of the luminance signal.

12. A magnetic recording medium according to any one of claims 1–6, wherein:
- the second magnetic layer is higher in coercivity than the first magnetic layer.

13. A magnetic recording medium according to any one of claims 1–6, wherein:
- the second magnetic layer has a center-line average surface roughness, Ra, of not more than 0.01 μm.

14. A magnetic recording medium according to any one of claims 1–6, wherein:
- the non-magnetic substrate has a center-line average surface roughness, Ra, of not more than 0.01.

15. A method for making a magnetic recording medium according to any one of claims 1–6, wherein:
- the non-magnetic substrate is coated thereon with a magnetic coating material for the first magnetic layer, followed by smoothing and drying, and
- another coating material for the second magnetic layer is then provided on the first magnetic layer by coating.

16. A medium according to any one of claims 1–6, wherein:
- the first magnetic layer comprises magnetic material which consists of magnetic particles having a BET value of between 30 and 45 $m^2/g$; and
- the second magnetic layer comprises magnetic material which consists of magnetic particles having a BET value of between 40 and 65 $m^2/g$.

17. A medium according to any one of claims 1, 4 or 6, wherein:
- said first layer has a coercivity of about 700 Oersted, a remanence of about 1800 Gauss and a squareness ratio of about 0.88, said second layer has a coercivity of about 930 Oersted, a remanence of about 1650 Gauss and a squareness ratio of about 0.89.

18. A magnetic recording medium according to any one of claims 1 or 7–10, wherein:
- said second magnetic layer has a thickness within the range between 0.2 and 0.4 μm.

19. A magnetic recording medium according to any one of claims 1 or 7–10, wherein:
- second magnetic layer has a thickness of about 0.3 μm.

20. A magnetic recording medium according to any one of claims 7–10, wherein said first and second magnetic layers have a total thickness of between 2.0 and 4.0 microns.

21. A magnetic recording medium according to claim 8, wherein the thickness of the second magnetic layer is between about 0.3 and 0.4 microns.

22. A magnetic recording medium according to claim 10, wherein:
- the first magnetic layer has a coercivity of between 600 and 700 Oersted and the second magnetic layer has a coercivity between 750 and 850 Oersted.

23. The magnetic recording medium according to claim 10, wherein the second magnetic layer has a thickness within the range between 0.2 and 0.5 μm.

* * * * *